US012736214B2

(12) United States Patent

Zhang et al.

(10) Patent No.: US 12,736,214 B2
(45) Date of Patent: Sep. 15, 2026

(54) CEILING-FAN LAMP WITH MULTIPLE CONTROL MODES

(71) Applicant: Foshan Carro Electrical Co., Ltd., Foshan (CN)

(72) Inventors: Jian-Sheng Zhang, Foshan (CN); Likui Xu, Foshan (CN)

(73) Assignee: FOSHAN CARRO ELECTRICAL CO., LTD., Foshan (CN)

( * ) Notice: Subject to any disclaimer, the term of this patent is extended or adjusted under 35 U.S.C. 154(b) by 326 days.

(21) Appl. No.: 18/608,981

(22) Filed: Mar. 19, 2024

(65) Prior Publication Data

US 2024/0328615 A1 Oct. 3, 2024

(30) Foreign Application Priority Data

Mar. 27, 2023 (CN) ......................... 202320620249.7

(51) Int. Cl.

| | |
|---|---|
| ***F21V 33/00*** | (2006.01) |
| ***F04D 25/08*** | (2006.01) |
| ***F04D 27/00*** | (2006.01) |
| ***F21S 8/04*** | (2006.01) |
| ***F21V 23/00*** | (2015.01) |
| ***F21V 23/02*** | (2006.01) |
| ***F21V 23/04*** | (2006.01) |
| ***H05B 47/19*** | (2020.01) |

(52) U.S. Cl.

CPC ........ *F21V 33/0096* (2013.01); *F04D 25/088* (2013.01); *F04D 27/007* (2013.01); *F21S 8/043* (2013.01); *F21V 23/004* (2013.01); *F21V 23/02* (2013.01); *F21V 23/0435* (2013.01); *H05B 47/19* (2020.01)

(58) Field of Classification Search

None

See application file for complete search history.

(56) References Cited

U.S. PATENT DOCUMENTS 10,954,948 B1 * 3/2021 Lowe .................. F04D 25/0606
11,029,019 B1 * 6/2021 Bucher ................. F04D 27/007
12,297,997 B1 * 5/2025 Yu ........................... F21S 8/063

(Continued)

*Primary Examiner* — Howard Cortes

(74) *Attorney, Agent, or Firm* — WPAT, PC

(57) ABSTRACT

The present invention relates to household appliances, and in particular to a ceiling-fan lamp with multiple control modes, including a control circuit board, which includes a control-and-management module, an action control module for receiving action signals from a pull wire, and a motor drive module electrically connected to a ceiling-fan motor, a communication module configured to receive communication signals, and a lamp driver module electrically connected to a lamp; the control-and-management module is configured to receive and process the action signals or the communication signals. The present invention includes a motor, a lamp and a control-and-management module operating at a safety DC ultra-low voltage (less than or equal to 48V) which adopts digital signals for communication; the control-and-management module (equipped with an MCU), through communicating with the action control module and various other control modes such as the communication module, achieves precise control of the ceiling-fan lamp.

11 Claims, 11 Drawing Sheets

(56) References Cited

U.S. PATENT DOCUMENTS

| | | | | |
|---|---|---|---|---|
| 2011/0062888 | A1* | 3/2011 | Bondy | H05B 45/3725 315/294 |
| 2016/0047391 | A1* | 2/2016 | McPherson | F04D 25/0693 318/504 |
| 2019/0191521 | A1* | 6/2019 | Kim | G01S 13/0209 |
| 2022/0159806 | A1* | 5/2022 | Han | H05B 45/10 |

* cited by examiner

CEILING-FAN LAMP WITH MULTIPLE CONTROL MODES

CROSS REFERENCE TO RELATED APPLICATION(S)

This application claims the priority to patent application No. 202320620249.7 filed in China on Mar. 27, 2023, which is hereby incorporated in its entirety by reference into the present application.

BACKGROUND OF THE INVENTION

1. Field of the Invention

The present invention relates to household appliances, and in particular to a ceiling-fan lamp with multiple control modes.

2. Description of the Related Art

A ceiling-fan lamp is also called a decorative ceiling fan. The ceiling-fan lamp installs a lighting fixture and a ceiling fan together, making a perfect combination of the lighting fixture and the ceiling fan. The ceiling-fan lamp has the lighting function, decorative function of the lighting fixture and the function of the fan; as a result, the ceiling-fan lamp is widely used for indoor decoration.

Presently, a common control mode of a ceiling-fan lamp is by hand-controlling a pull wire of the ceiling fan lamp to respectively select speed options of the ceiling fan and to select ON/OFF states of the lamp, which has the following problems: (1) only a single control mode is available, and there is no other way to control the ceiling-fan lamp when the pull wire is broken; (2) it requires a user to manually control the pull wire in a proximity of the pull wire, which brings in inconvenient user experiences.

SUMMARY OF THE INVENTION

A purpose of the present invention is to propose a ceiling-fan lamp with multiple control modes, which can realize precise control of the ceiling fan and the lamp by multiple control modes, and provide convenience for a user.

In order to achieve the purpose, the present invention provides the following technical solutions:

A ceiling-fan lamp with multiple control modes, characterized by including a housing, a ceiling-fan motor, a lamp, ceiling-fan blades, a pull wire and a control circuit board;

the ceiling-fan motor, the lamp and the control circuit board all installed in an accommodating cavity of the housing, and the ceiling-fan blades and the pull wire respectively extending to an exterior of the housing;

the control circuit board being electrically connected to a DC power supply with voltage less than or equal to 48V, and the control circuit board including a control-and-management module, an action control module, a communication module, a motor drive module and a lamp driver module;

the action control module and the communication module being electrically connected to the control-and-management module respectively, the action control module configured to receive action signals generated by the pull wire, the action signals being 5V or less digital signals, the communication module configured to receive communication signals;

the motor drive module being electrically connected to the ceiling-fan motor; the lamp driver module being electrically connected to the lamp;

the control-and-management module configured to receive and process the action signals or the communication signals, and then providing the first control signals and the second control signals respectively to the motor drive module and the lamp driver module, and the motor drive module configured to drive the ceiling-fan motor to work or stop working according to the first control signals, so as to control the rotation or stopping of the ceiling-fan blades; the lamp driver module configured to control the lamp to glow or go out according to the second control signals.

Preferably, the control-and-management module includes a control-and-management chip, capacitor C7, capacitor C9, capacitor C15, capacitor C18 and write port J3;

pin 1 of the control-and-management chip being a low-voltage power supply terminal, pin 1 of the control-and-management chip and one end of capacitor C18 both being connected to a 5V voltage, and the other end of capacitor C18 being grounded;

pin 2 and pin 3 of the control-and-management chip both being PWM channel terminals, and pin 2 and pin 3 of the control-and-management chip both being electrically connected to the lamp driver module;

pin 4 of the control-and-management chip being an ADC channel terminal, and pin 4 of the control-and-management chip being electrically connected to the communication module;

pin 5, pin 9, pin 10, pin 11, pin 12, pin 13, pin 14, pin 16, pin 17, pin 18 and pin 19 of the control-and-management chip being PWM drive output terminals, and pin 5, pin 9, pin 10, pin 11, pin 12, pin 13, pin 14, pin 16, pin 17, pin 18 and pin 19 of the control-and-management chip all being electrically connected to the motor drive module;

pin 6 of the control-and-management chip being an ADC channel terminal, and pin 6 of the control-and-management chip being electrically connected to the power input module;

pin 7 of the control-and-management chip being a 5V LDO output terminal, and pin 7 of the control-and-management chip being electrically connected to one end of the capacitor C15, and the other end of the capacitor C15 being grounded;

pin 8 of the control-and-management chip being a medium-voltage power supply terminal, pin 8 of the control-and-management chip being electrically connected to one end of the capacitor C9, and the other end of the capacitor C9 being grounded;

pin 15 of the control-and-management chip being a system ground terminal and pin 15 of the control-and-management chip being grounded;

pin 20 of the control-and-management chip being an I/O signal terminal, and pin 20 of the control-and-management chip being electrically connected to the action control module;

pin 21 of the control-and-management chip being an I/O signal terminal, and pin 21 of the control-and-management chip being electrically connected to both the action control module and the communication module;

pin 22 of the control-and-management chip being an SWD clock terminal, pin 22 of the control-and-management chip being electrically connected to pin 3 of the write port, pin 1 of the write port being connected to 5V, and pin 2 of the write port being grounded;

pin 23 of the control-and-management chip being an SWD data terminal, pin 23 of the control-and-management chip being electrically connected to the action control module.

Preferably, the control circuit board further includes a power input module and a DC-DC module;

the power input module including a power input port, capacitor C3, capacitor C4, capacitor C19, resistor R5, resistor R6, voltage regulator diode DZ1 and voltage regulator diode DZ7;

pin 2 of the power input port, one end of capacitor C19, one end of capacitor C3, a negative lead of voltage regulator diode DZ7, and one end of resistor R5 all being electrically connected to both an input terminal of the DC-DC module and the motor drive module;

pin 1 of the power input port, the other end of capacitor C19, the other end of capacitor C3, a positive lead of voltage regulator diode DZ7, one end of resistor R6, a positive lead of voltage regulator diode DZ1, and one end of capacitor C4 all being grounded;

the other end of resistor R5, the other end of resistor R6, a negative lead of voltage regulator diode DZ1 and the other end of capacitor C4 all being electrically connected to the control-and-management module.

Preferably, the DC-DC module comprises a DC-DC chip, a capacitor C1, an inductor L1 and a capacitor C25;

pin 4 of the DC-DC chip being a power input terminal, and pin 4 of the DC-DC chip being electrically connected to both pin 2 of the power input port and one end of capacitor C1;

pin 3 of the DC-DC chip being an output port, pin 5 of the DC-DC chip being an output voltage feedback port, and pin 3 of the DC-DC chip being electrically connected to one end of inductor L1, the other end of inductor L1 and pin 5 of the DC-DC chip both being electrically connected to one end of capacitor C25; the one end of capacitor C25 served as a 5V voltage output terminal, pin 1 of the write port being electrically connected to the 5V voltage output terminal;

pin 2 of the DC-DC chip being a ground terminal, and pin 2 of the DC-DC chip, the other end of capacitor C1, and the other end of capacitor C25 all being grounded.

Preferably, the action control module includes a wire-pulling control port, diode D1, diode D7, diode D13 and resistor R14;

the wire-pulling control port being externally connected to the pull wire;

pin 4 of the wire-pulling control port being electrically connected to both a negative lead of diode D7 and the control-and-management module;

pin 3 of the wire-pulling control port being electrically connected to both a negative lead of diode D1 and the control-and-management module;

pin 2 of the wire-pulling control port being electrically connected to both a negative lead of diode D13 and the control-and-management module;

pin 1 of the wire-pulling control port being electrically connected to one end of resistor R14;

a positive lead of diode D7, a positive lead of diode D1, a positive lead of diode D13 and the other end of resistor R14 all being grounded.

Preferably, the communication module is an RF module which includes an RF port, capacitor C12, capacitor C13, capacitor C30 and resistor R36;

pin 4 of the RF port, one end of capacitor C12 and one end of capacitor C13 all being electrically connected to a 5V voltage output terminal, and the other end of capacitor C12 and the other end of capacitor C13 both being grounded;

pin 3 and pin 2 of the RF port both being electrically connected to one end of resistor R36, the other end of resistor R36 being electrically connected to both the control-and-management module and one end of capacitor C30, and the other end of capacitor C30 and pin 1 of the RF port both being grounded.

Preferably, the communication module is a Wi-Fi module which includes a Wi-Fi chip, capacitor C8, capacitor C14, resistor R37 and resistor R42;

VBAT terminal of the Wi-Fi chip being a power input terminal, the VBAT terminal of the Wi-Fi chip, one end of capacitor C8 and one end of capacitor C14 all being electrically connected to the 5V voltage output terminal, and the other end of capacitor C8, the other end of capacitor C14 and GND terminal of the Wi-Fi chip all being grounded;

an RXD2 pin of the WIFI chip being a serial port communication terminal, the RXD2 pin of the WIFI chip being electrically connected to one end of resistor R42, and the other end of resistor R42 being electrically connected to the control-and-management module;

a TXD pin of the WIFI chip being a serial port communication terminal, the TXD pin of the WIFI chip being electrically connected to one end of resistor R37, the other end of resistor R37 being electrically connected to one end of resistor R15, and the other end of resistor R15 being connected to an optocoupler-detection reserved hole.

Preferably, the motor drive module includes a first switching transistor chip, a second switching transistor chip, a third switching transistor chip and socket J1;

pin 2 of the first switching transistor chip being electrically connected to one end of resistor R21 and one end of resistor R27 both, and the other end of resistor R21 being electrically connected to the control-and-management module, the other end of resistor R27 and pin 1 of the first switching transistor chip both being electrically connected to all of one end of resistor R29, one end of resistor R11, one end of resistor R31, and one end of resistor R35, and the other end of resistor R29 being grounded, the other end of resistor R11 being electrically connected to both one end of capacitor C11 and the control-and-management module, and the other end of capacitor C11 being electrically connected to both one end of resistor R28 and the control-and-management module, and the other end of resistor R28 being electrically connected to the third switching transistor chip, and the other end of resistor R31 being electrically connected to both one end of capacitor C10 and the control-and-management module, and the other end of the capacitor C10 being electrically connected to both one end of the resistor R32 and the control management module, the other end of resistor R32 being electrically connected to the second switching transistor chip, and the other end of resistor R35 being electrically connected to both one end of capacitor C16 and the control management module, the other end of capacitor C16 being grounded;

pin 3 of the first switching transistor chip being electrically connected to all of one end of the resistor R26, the control management module, the motor drive module, the power input module, the DC-DC module and the welding wires, both the other end of resistor R26 and pin 4 of the first switching transistor chip being electrically connected to one end of resistor R20, and the other end of resistor R20 being electrically connected to the control management module;

pin 5, pin 6, pin 7, and pin 8 of the first switching transistor chip all being electrically connected to pin 3 of socket J1;

pin 2 of the second switching transistor chip being electrically connected to both one end of resistor R19 and one end of resistor R25, and the other end of resistor R19 being electrically connected to the control-and-management module, and both the other end of resistor R25 and pin 1 of the second switching transistor chip being electrically connected to both one end of resistor R30 and the other end of resistor R32, and the other end of resistor R30 being grounded;

pin 3 of the second switching transistor chip being electrically connected to all of one end of resistor R24, the control-and-management module, the motor drive module, the power input module, the DC-DC module and the soldering wires, both the other end of resistor R24 and pin 4 of the second switching transistor chip being electrically connected to one end of resistor R18, and the other end of resistor R18 being electrically connected to the control-and-management module;

pin 5, pin 6, pin 7 and pin 8 of the second switching transistor chip all being electrically connected to pin 2 of socket J1;

pin 2 of the third switching transistor chip being electrically connected to both one end of resistor R17 and one end of resistor R23, and the other end of resistor R17 being electrically connected to the control-and-management module, and both the other end of resistor R23 and pin 1 of the third switching transistor chip being electrically connected to both one end of resistor R33 and the other end of resistor R28, and the other end of resistor R33 being grounded;

pin 3 of the third switching transistor chip being electrically connected to all of one end of resistor R22, the control-and-management module, the motor drive module, the power input module, the DC-DC module and the soldering wires, and both the other end of resistor R22 and pin 4 of the third switching transistor chip being electrically connected to one end of resistor R16, and the other end of resistor R16 being electrically connected to the control-and-management module;

pin 5, pin 6, pin 7 and pin 8 of the third switching transistor chip all electrically connected to pin 1 of socket J1.

Preferably, the lamp driver module includes socket J7;

both pin 1 and pin 2 of socket J7 being electrically connected to the control-and-management module, the motor drive module, the power input module and the DC-DC module via the soldering wires;

pin 3 of socket J7 being grounded;

pin 4 of socket J7 being connected to 5V voltage;

both pin 5 and pin 6 of socket J7 being electrically connected to the control-and-management module.

In order to make the above objects, features and advantages of the present invention more apparent and easier to understand, the following embodiments, together with the accompanying drawings, are described in detail as follows.

DETAILED DESCRIPTION OF THE INVENTION

The technical solution of the present invention is further described below in conjunction with the accompanying drawings and by means of specific embodiments. In the description of the present invention, it is to be understood that the terms "center", "longitudinal", "lateral", "length", "width", "thickness", "top", "bottom", "left", "right", "vertical", "horizontal", "top", "bottom", "inner", "outer", "axial", "radial", "circumferential" and the like indicate orientation or positional relationships based on those shown in the accompanying drawings, and are intended only to facilitate the description of the present invention and to simplify the description, and are not intended to indicate or imply that the device or element referred to must have a particular orientation, or be constructed and operated in a particular orientation and therefore cannot be construed as limitations of the present invention.

Furthermore, the terms "first" and "second" are used for descriptive purposes only and are not to be understood as indicating or implying relative importance or implicitly specifying the number of technical features indicated. Thus, the feature defined with "first", "second" may include one or more such features, either explicitly or implicitly. In the description of the present invention, unless otherwise specified, "more than one" means two or more.

In the description of the present invention, it is to be noted that, unless otherwise expressly specified and limited, the terms "mounted", "connected", and "connecting" are to be understood in a broad sense. For example, it may be a fixed connection, a removable connection, or a connection in one piece; it may be a direct connection, an indirect connection through an intermediate medium, or a connection within two elements. For a person of ordinary skill in the art, the specific meaning of the above terms in the present invention may be understood in a specific context.

Figure 1:
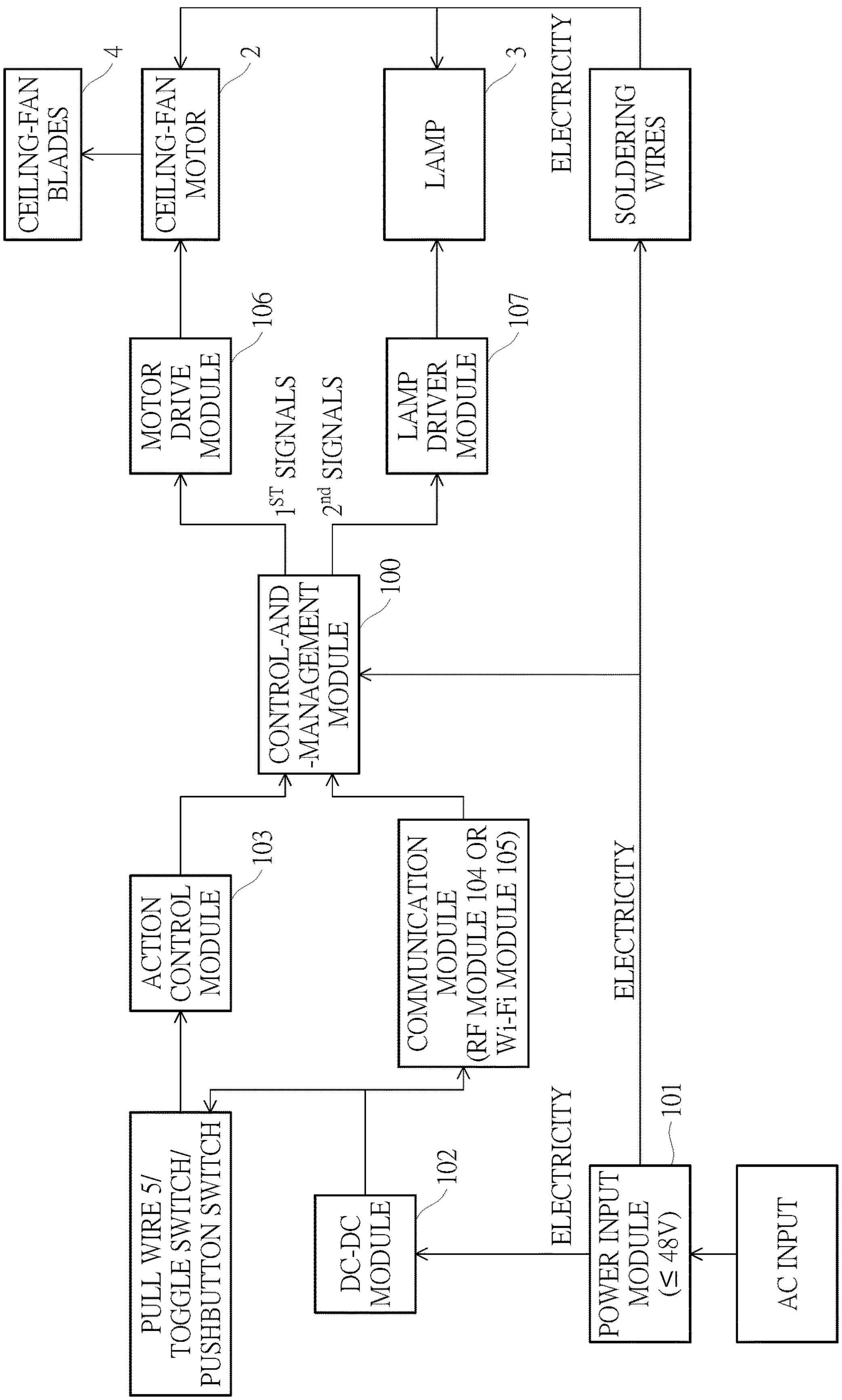
FIG. 1 is a module connection diagram of a control circuit board of the ceiling-fan lamp with multiple control modes of the present invention.
Figure 2:
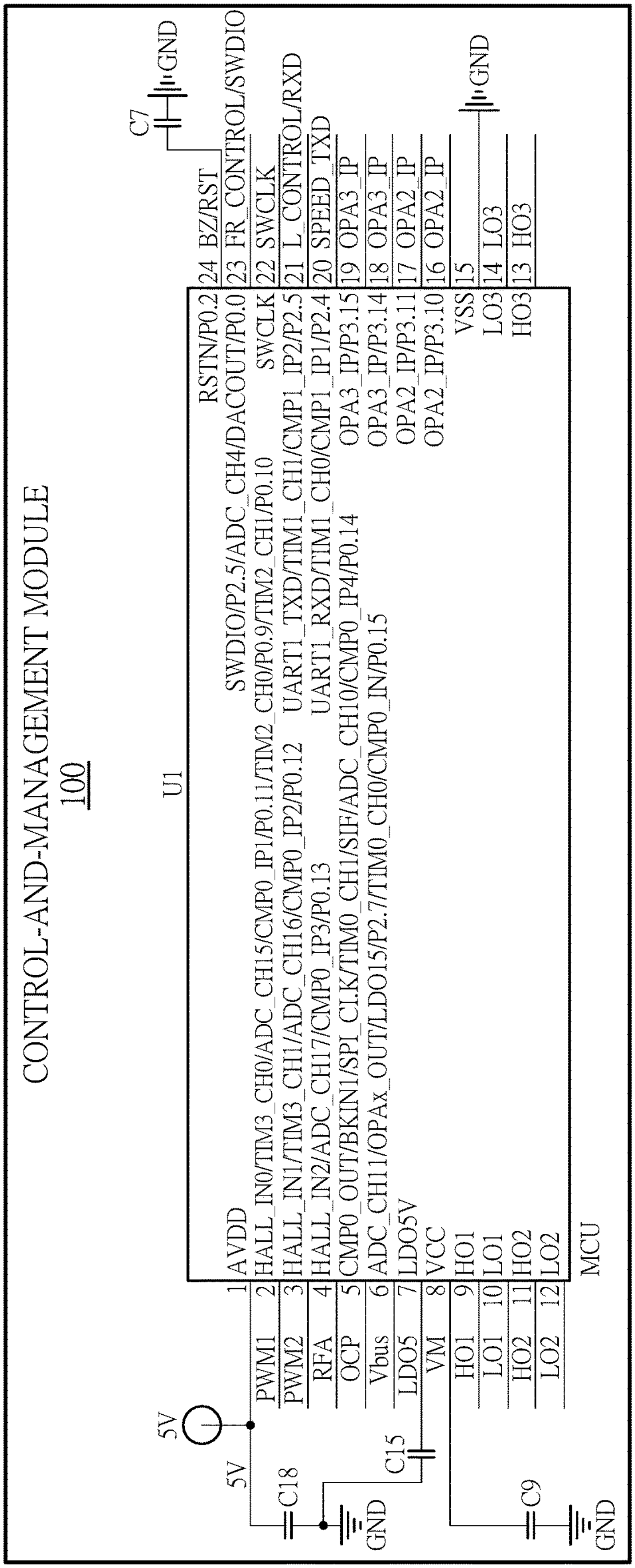
FIG. 2 is a diagram of a control-and-management module of the control circuit board of the ceiling-fan lamp with multiple control modes of the present invention.
Figure 3:
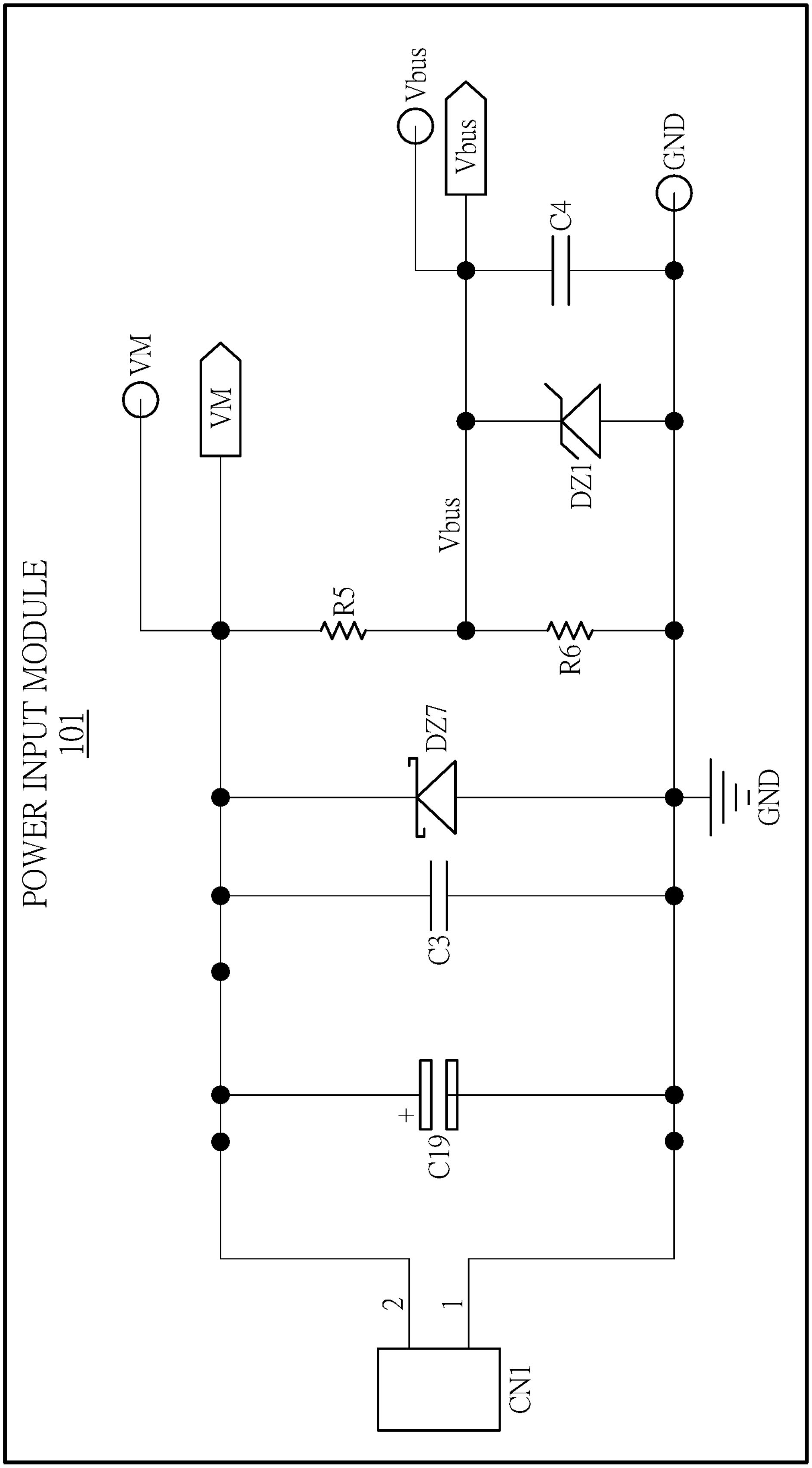
FIG. 3 is a diagram of a power input module of the control circuit board of the ceiling-fan lamp with multiple control modes of the present invention.
Figure 4:
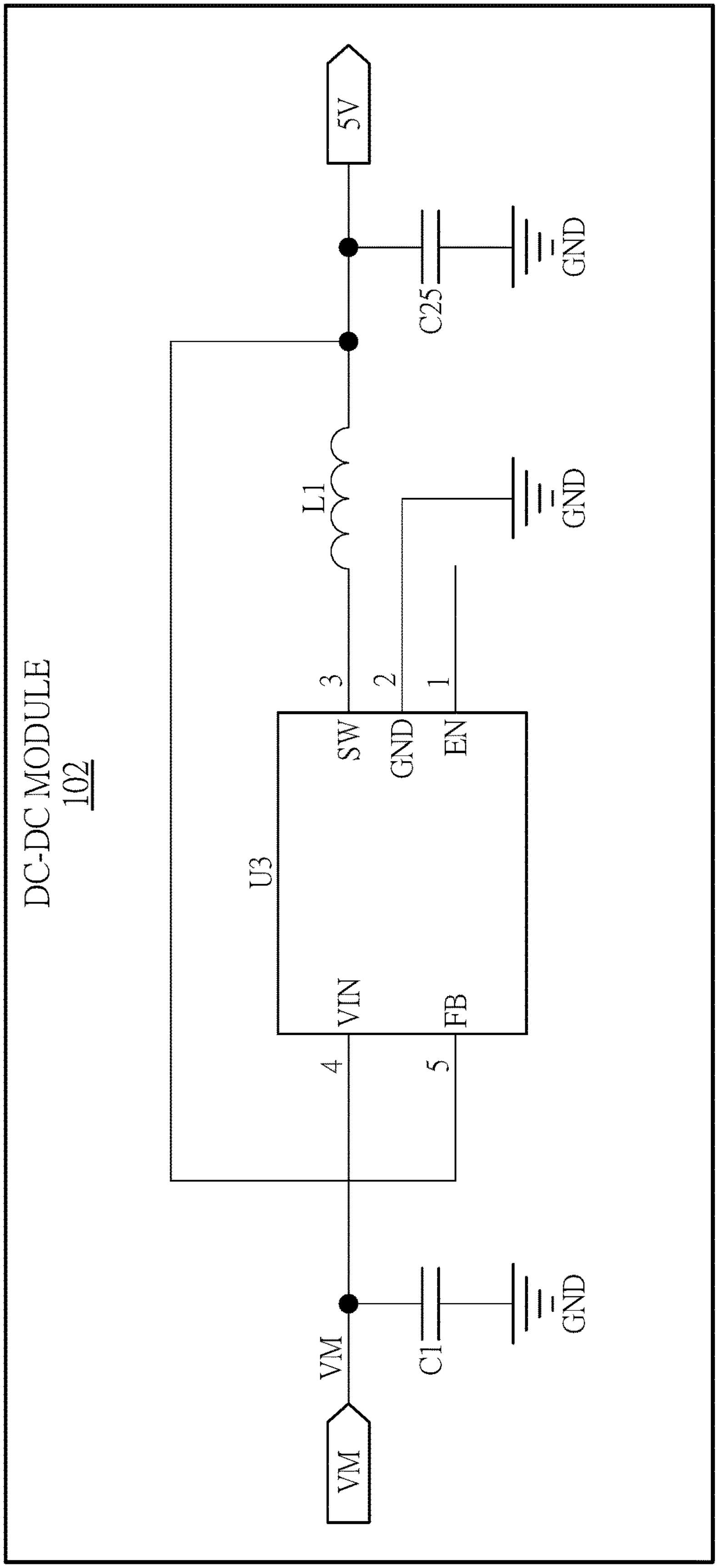
FIG. 4 is a diagram of a DC-DC module of the control circuit board of the ceiling-fan lamp with multiple control modes of the present invention.
Figure 5:
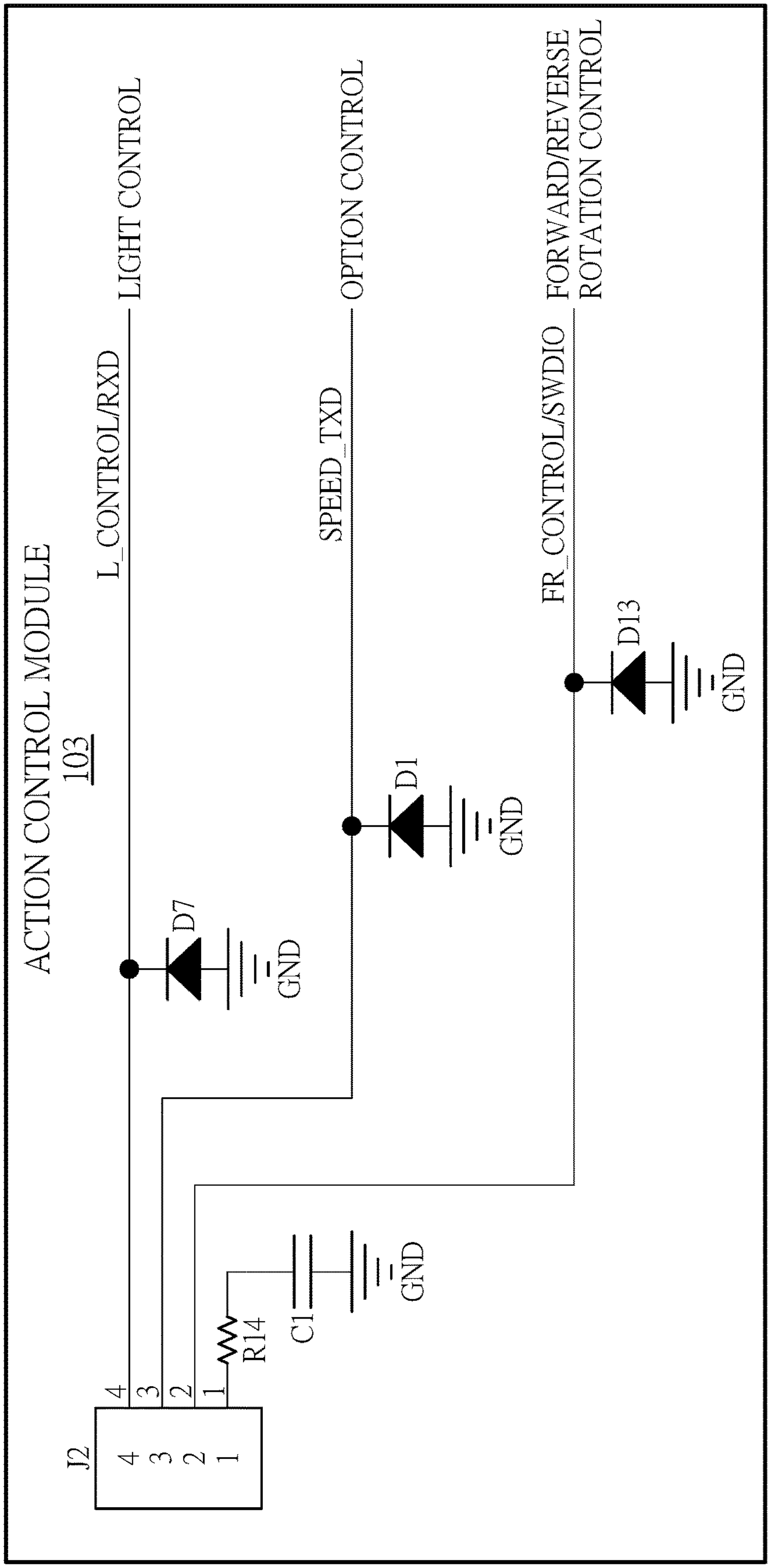
FIG. 5 is a diagram of a wire-pulling control module of the control circuit board of the ceiling-fan lamp with multiple control modes of the present invention.
Figure 6:
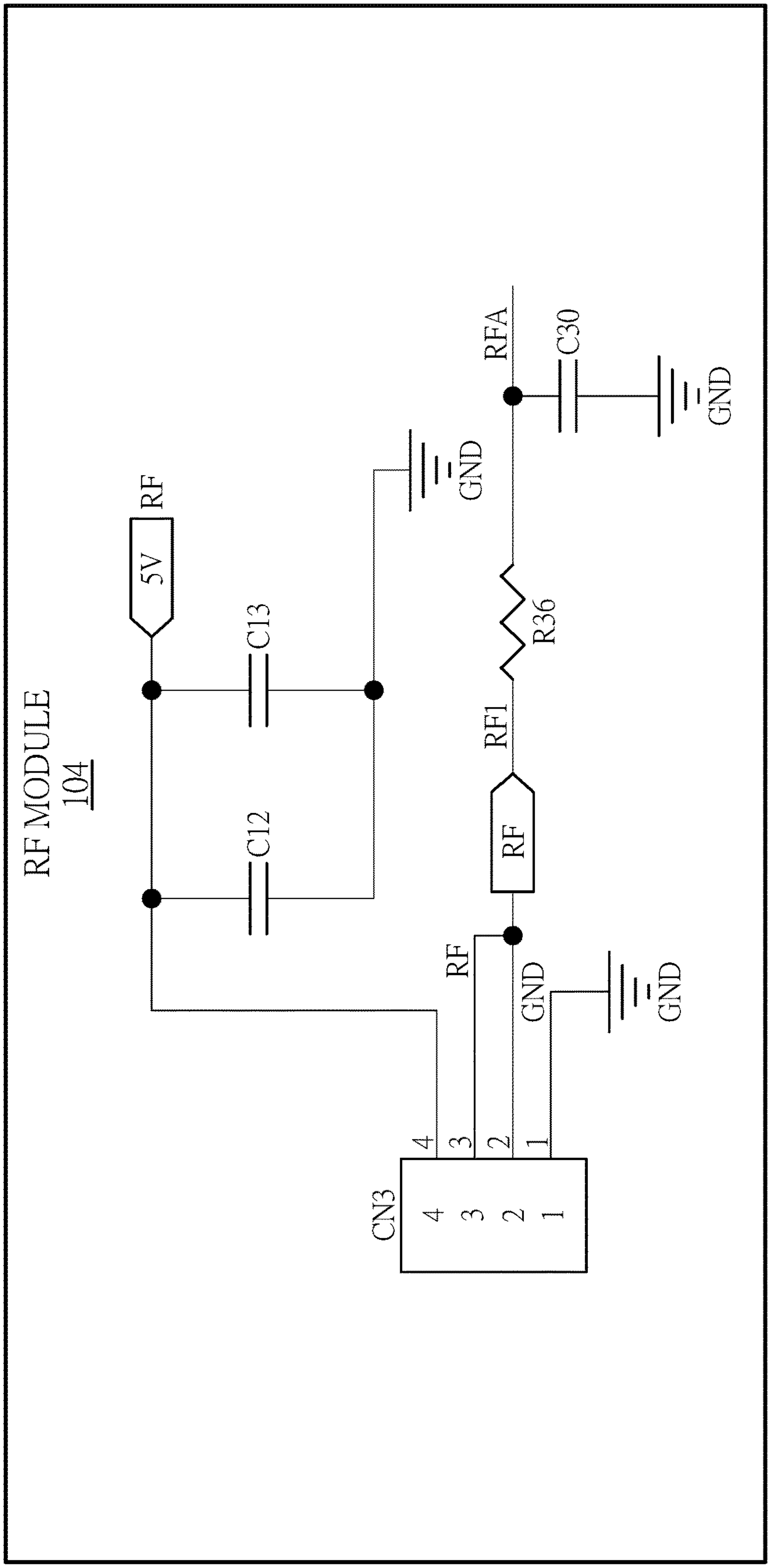
FIG. 6 is a diagram of an RF module of the control circuit board of the ceiling-fan lamp with multiple control modes of the present invention.
Figure 7:
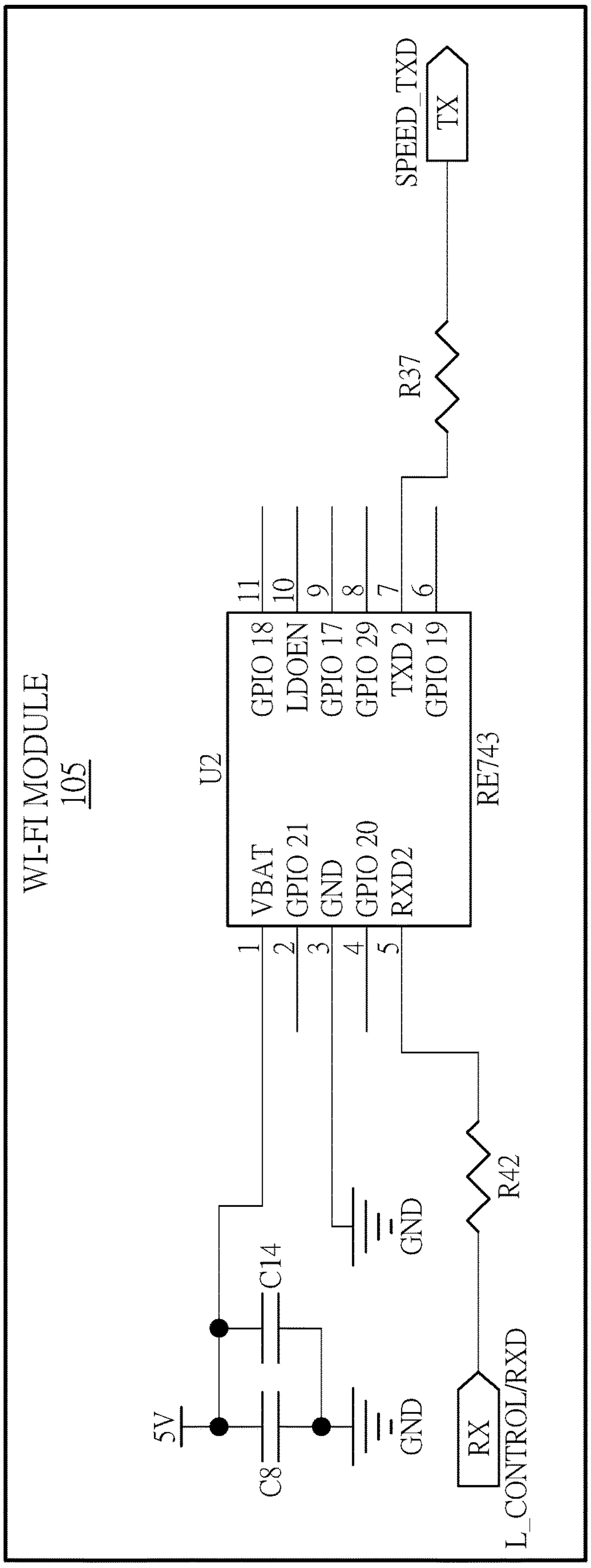
FIG. 7 is a diagram of a Wi-Fi module of the control circuit board of the ceiling-fan lamp with multiple control modes of the present invention.
Figure 8:
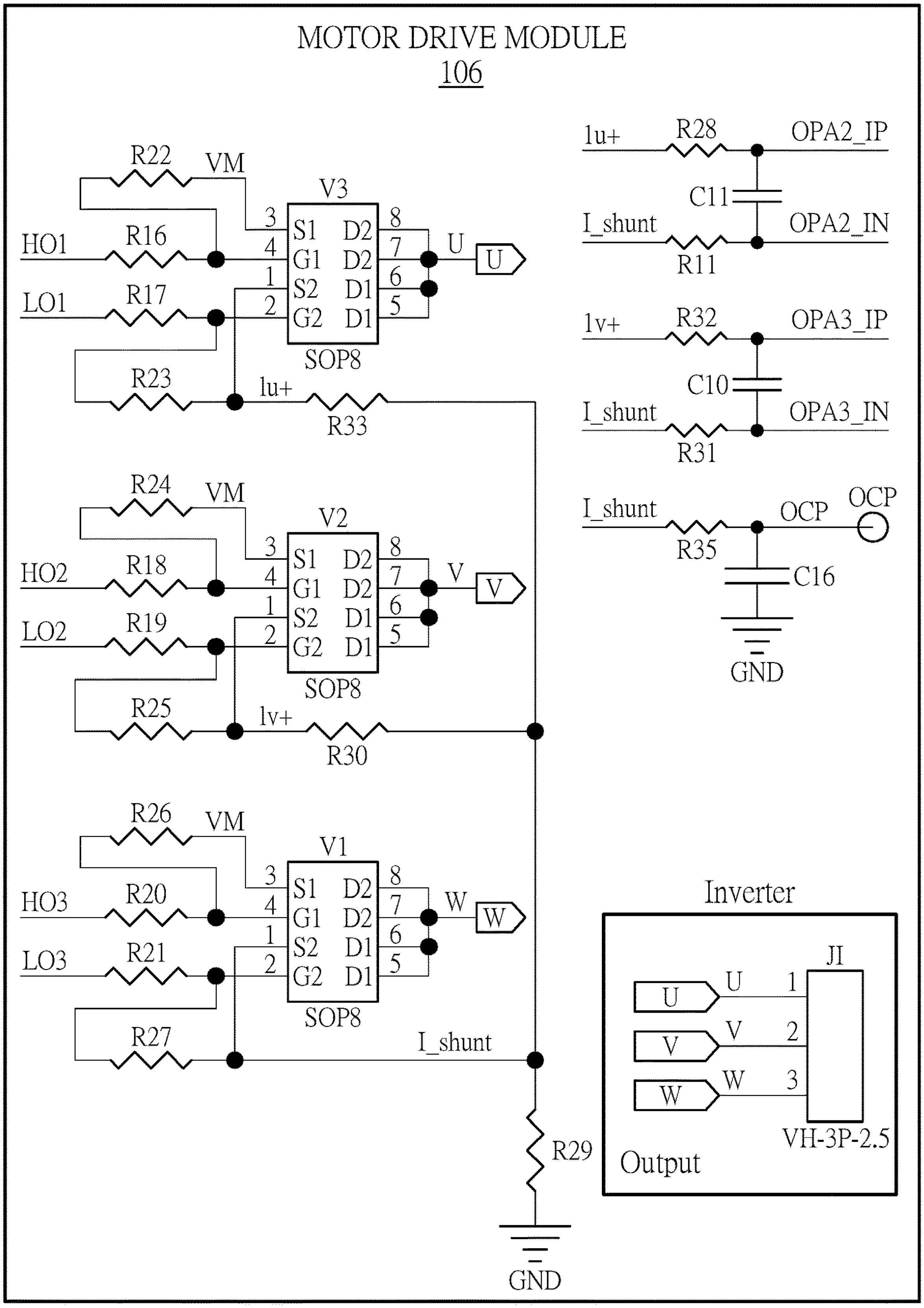
FIG. 8 is a diagram of a motor drive module of the control circuit board of the ceiling-fan lamp with multiple control modes of the present invention.
Figure 9:
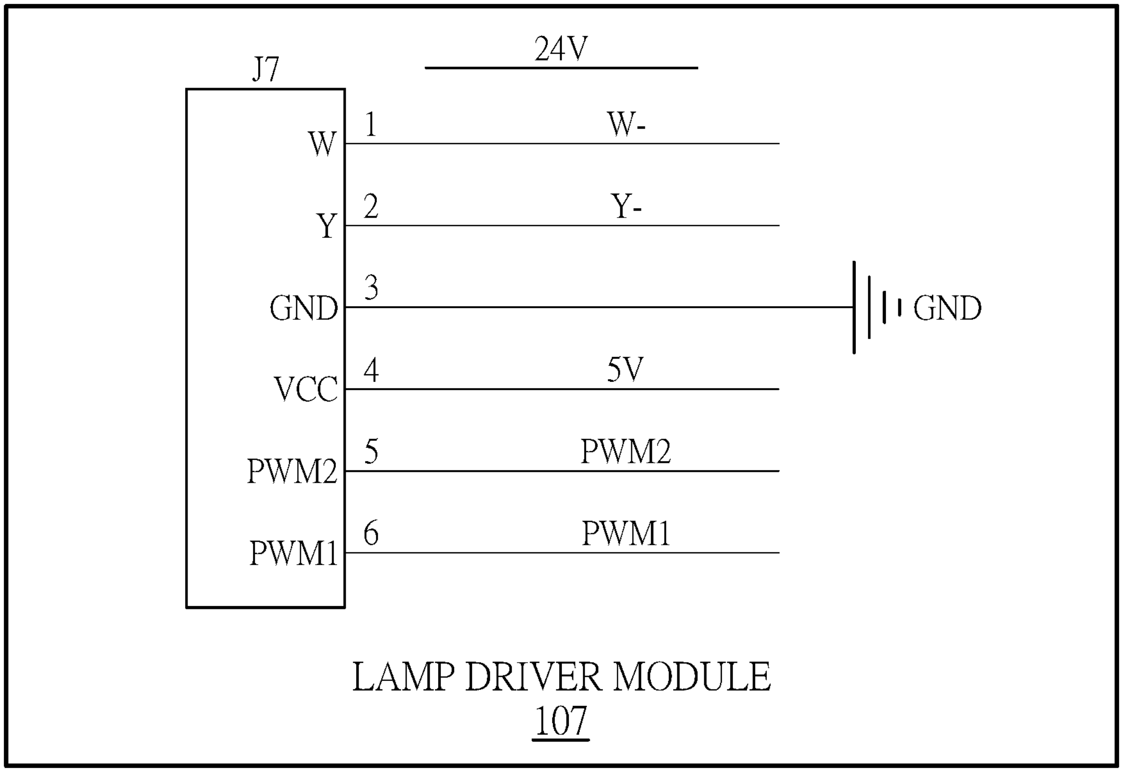
FIG. 9 is a diagram of a lamp driver module of the control circuit board of the ceiling-fan lamp with multiple control modes of the present invention.
Figure 9:
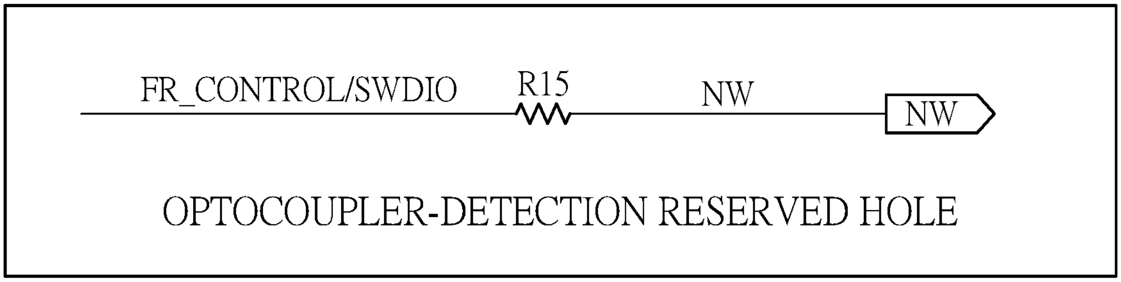
Figure 9:
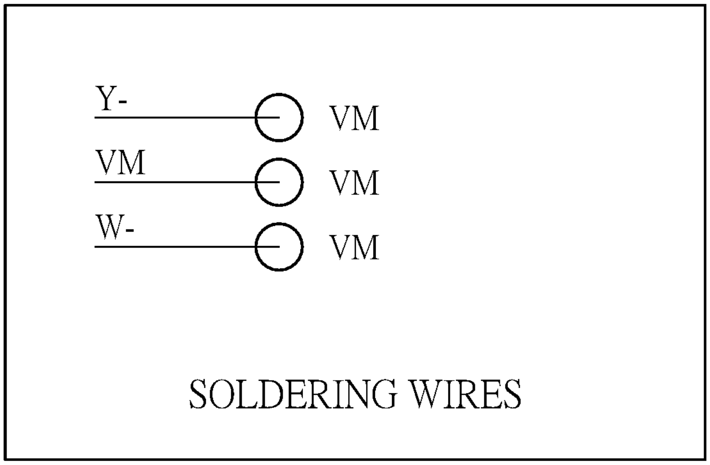
Figure 10:
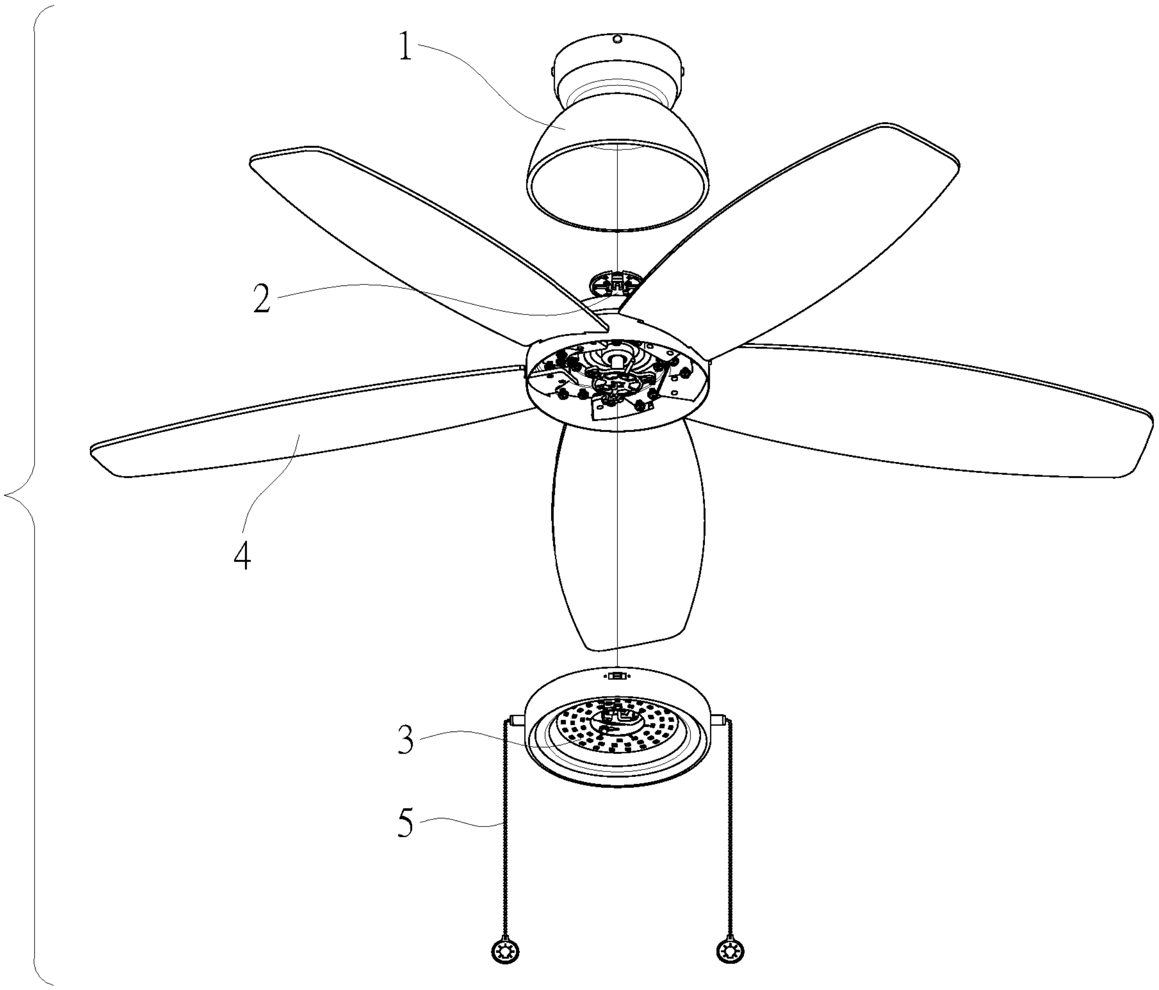
FIG. 10 is a structure diagram of the ceiling-fan lamp with multiple control modes of the present invention.
Figure 11:
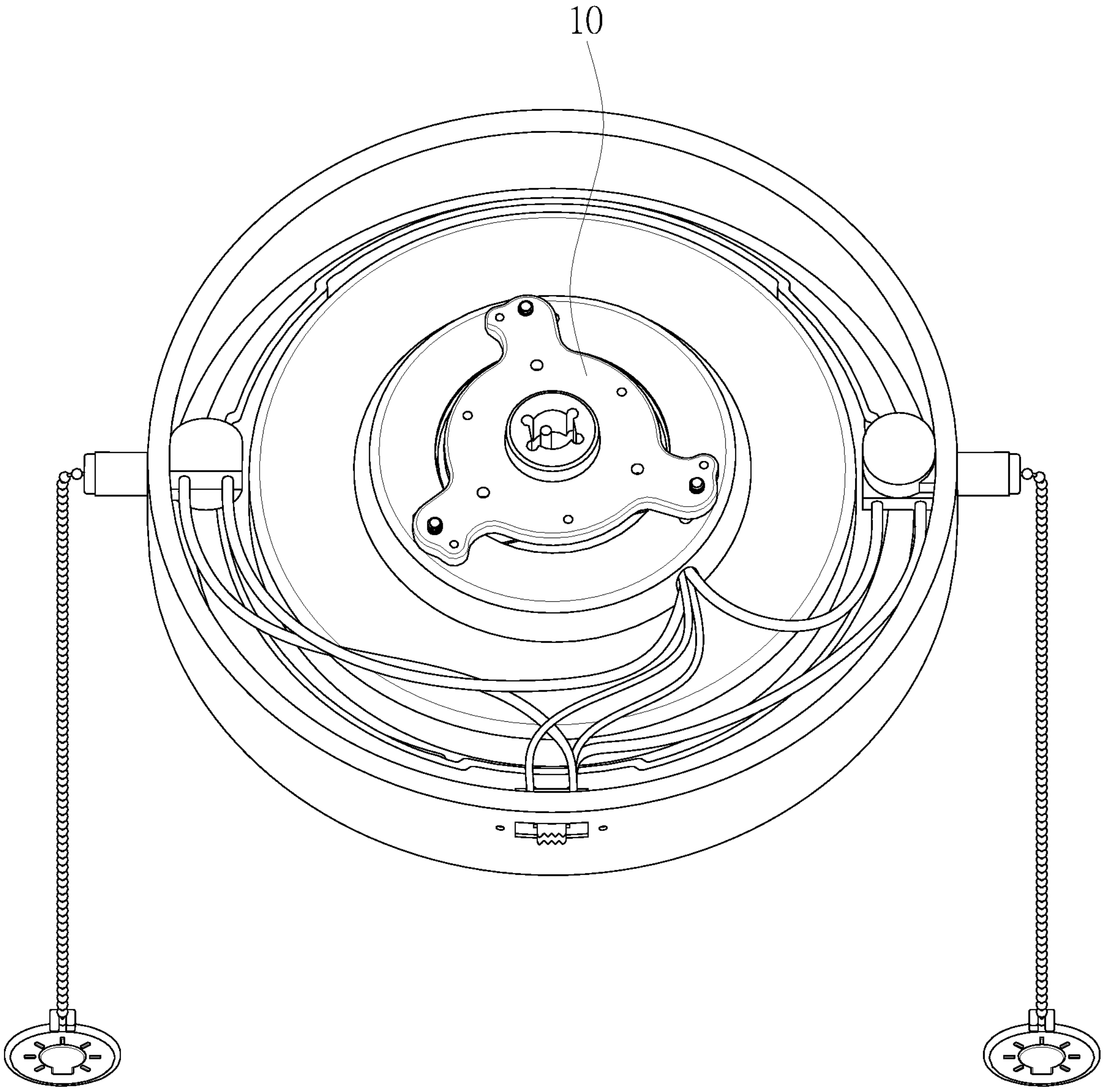
FIG. 11 shows an enlarged structure diagram of a top view of a lamp portion of FIG. 10.

As shown in FIGS. 1-11, a ceiling-fan lamp with multiple control modes, includes a housing 1, a ceiling-fan motor 2, a lamp 3, a ceiling fan blade 4, a pull wire 5 and a control circuit board 10.

The ceiling-fan motor 2, lamp 3 and control circuit board 10 are mounted in the accommodating cavity of the housing 1, and the ceiling-fan blades 4 and pull wire 5 respectively extend to an exterior of the housing 1.

The control circuit board is electrically connected to a DC power supply with a voltage less than or equal to 48V, the control circuit board 10 includes a control and management module 100, an action control module 103, a communication module, a motor drive module 106 and a lamp driver module 107.

The action control module 103 and the communication module are electrically connected to the control-and-management module 100 respectively. The action control module 103 is configured to receive action signals from the pull wire 5. The communication module is configured to receive communication signals. The action signals are 5V or less digital signals. The communication module is configured to receive communication signals.

The motor drive module 106 is electrically connected to the ceiling-fan motor 2, and the lamp driver module 107 is electrically connected to the lamp 3; the communication module and the action control module 103 are electrically connected to the DC-DC module 102.

After the control-and-management module 100 is configured to receive and process the action signals or the communication signals, the control-and-management module 100 provides first control signals and second control signals to the motor drive module 106 and the lamp driver module 107 respectively. The motor drive module 106 is configured to drive the ceiling-fan motor 2 to work or stop working according to the first control signals, so as to control the ceiling-fan blades 4 to rotate or stop rotating. The lamp driver module 107 is configured to control the lamp 3 to glow or go out according to the second control signals.

The present invention includes multiple communication modules that respectively receive Wi-Fi signals or RF signals such as Bluetooth, and further includes an action control module 103 that receives the action signals generated by the pull wire 5, and the above signals do not interfere with each other when they are used in parallel. The communication module and the action control module 103 can respectively decode received signals and transmit the decoded signals to the control-and-management module 100 equipped with an MCU (micro-controller unit) on the control circuit board 10. Subsequently, the control-and-management module 100 processes the decoded signals received with a time division method, and the decoded signals do not interfere with each other. Based on the latest received decoded signals, the control management module 100 issues corresponding control commands to both the motor drive module 106 and the lamp driver module 107 to realize corresponding functions of the ceiling fan and the lamp 3.

Specifically, when the pull wire 5 is configured to generate action signals, i.e. 5V or less digital signals, the control-and-management module 100 detects a voltage level on an MCU pin for a corresponding switch or the action control module 103 controls the MCU by reading high-and-low-level changes of the MCU pin of the corresponding switch. That is, the control management module 100 determines whether a protocol is based on the voltage or the high-and-low-level changes to decode the corresponding voltage or the high-and-low-level changes, and issues corresponding control instructions to realize a corresponding function.

It is to be noted that the action control module 103 may be a pull wire control module or a toggle control module or a pushbutton control module or combinations of the above control modules, which may be mounted on the housing 1 by means of the pull wire 5 or a toggle switch or a pushbutton switch to generate action signals or toggle signals or pushbutton signals.

The control-and-management module 100 and the motor drive module 106 can realize two functions, i.e., a control-and-management function and a motor drive function, with just one MCU chip, or with one MCU chip for the control-and-management function and another MCU chip for the motor drive function.

At present, our safety voltage standard specifies the safety voltage level of alternating current as:

1) 42 volts (under no-load condition: upper limit is less than or equal to 50 volts) can be used in places where there is a risk of electric shock, such as hand-held power tools;
2) 36 volts (under no-load condition: upper limit is less than or equal to 43 volts), electric lanterns used in places like mines or places with significant conductive dusts.
3) 24V, 12V, 6V (under no-load condition: upper limit less than or equal to 29V, 15V, 8V, respectively) options are available for certain equipment where the human body may accidentally touch a charged body.

Therefore, when working in large boilers, metal containers, or in generators, 12-volt or 6-volt low-voltage electric lanterns must be utilized to ensure personal safety. When an electrical equipment is operated with a safe voltage of 24 volts or more, a worker must be protected from direct contact with the electrical equipment if charged, and circuits of the electrical equipment must be insulated from the earth. As well-known to the public, a safe voltage is determined by the product of a permissible current and a resistance of a human body, therefore, when the electrical equipment adopts a safe voltage of more than 24V, protective measures must be taken to prevent a worker from direct contact with a charged body.

In summary, the control circuit board 10 of the present invention is made of fiberglass copper foil board, and it has safety ultra-low voltage less than or equal to 48V, therefore, the ceiling-fan lamp of the present invention does not need to set up insulated housing and heat dissipation elements, and the control circuit board 10 can be directly mounted on the housing, one of more than one of the pull wire 5 or toggle switch or pushbutton can be mounted on the housing, and hence the structure is simple. Therefore, the present invention is a ceiling-fan lamp with safety ultra-low voltage less than or equal to 48V, which adopts 5V or less digital signals to have direct communication between the MCU and both the action control module 103 and the communication module with multiple control modes in parallel, multiple signals from the multiple control modes do not interfere with each other, so as to realize precise control of the ceiling-fan lamp 3, direct information transfer, simple circuitry, safe to use, easy and convenient installation, user-friendly, and low overall cost with high safety during an entire product life cycle.

To illustrate further, the control-and-management module 100 includes the control-and-management chip U1_(MCU), capacitor C7, capacitor C9, capacitor C15, capacitor C18 and write port J3.

Pin 1 of the control-and-management chip U1 is a low-voltage power supply terminal, pin 1 of the control-and-management chip U1 and one end of the capacitor C18 are connected to 5V, and the other end of the capacitor C18 is grounded. The other end of the capacitor C18 is grounded.

Both pin 2 and pin 3 of the control-and-management chip U1 are PWM channel terminals, and both pin 2 and pin 3 of the control-and-management chip U1 are electrically connected to the lamp driver module 107.

Pin 4 of the control-and-management chip U1 is an ADC channel terminal, and pin 4 of the control-and-management chip U1 is electrically connected to the communication module.

Pin 5, pin 9, pin 10, pin 11, pin 12, pin 13, pin 14, pin 16, pin 17, pin 18 and pin 19 of the control-and-management chip U1 are all PWM drive output terminals, and pin 5, pin 9, pin 10, pin 11, pin 12, pin 13, pin 14, pin 16, pin 17, pin 18 and pin 19 of the control-and-management chip U1 are all connected to the motor drive module 106.

Pin 6 of the control-and-management chip U1 is an ADC channel terminal, and pin 6 of the control-and-management chip U1 is electrically connected to the power input module 101.

Pin 7 of the control-and-management chip U1 is a 5V LDO output pin, and pin 7 of the control-and-management chip U1 is electrically connected to one end of capacitor C15, and the other end of capacitor C15 is grounded.

Pin 8 of the control-and-management chip U1 is a medium-voltage power supply terminal, pin 8 of the control-and-management chip U1 is electrically connected to one end of capacitor C9, and the other end of capacitor C9 is grounded.

Pin 15 of the control-and-management chip U1 is a system ground terminal, and pin 15 of the control-and-management chip U1 is grounded.

Pin 20 of the control-and-management chip U1 is an I/O signal terminal, and pin 20 of the control-and-management chip U1 is electrically connected to the action control module 103.

Pin 21 of the control-and-management chip U1 is an I/O signal terminal, and pin 21 of the control-and-management chip U1 is electrically connected to the action control module 103 and to the communication module respectively.

Pin 22 of the control-and-management chip U1 is an SWD clock terminal, pin 22 of the control-and-management chip U1 is electrically connected to pin 3 of write port J3, pin 1 of write port J3 is connected to 5V and pin 2 of write port J3 is grounded.

Pin 23 of the control-and-management chip U1 is an SWD data terminal, and pin 23 of the control-and-management chip U1 is electrically connected to the action control module 103.

At present, the ceiling-fan lamp only adopts a single chip of the control-and-management chip U1, which greatly reduces the complexity of the original circuit.

In addition, the control-and-management chip U1 has three functions, including control management, motion control, and motor drive, and is able to perform control management of multiple functions using only one chip, thus greatly simplifying the circuit structure. The control and management functions of the control-and-management chip U1 are further described as follows.

In this embodiment, trigger signals for the pull wire are designated to be a*, and the trigger signals for the action control module 103 are a1, a2, a3, a4 and a5.

The signals for remote control are designated to be b*, and remote-control signals are b1, b2, b3, b4 and b5.

The signals of Wi-Fi and Bluetooth are designated as c*, and the Wi-Fi signals are c1, c2, c3, c4, and c5; the control-and-management module 100, relies on a beginning code value of an identified signal to determine which type of signal the identified signal is, and subsequent decoding and executing of the identified signal is according to the identified type of signal. Even when used in parallel, the control-and-management module 100 automatically recognizes different types of input information, to first confirm the type of input information, then to decode the input information according to the type of the input information, and to generate a list of control signals for command execution, so that when a signal of a different type is generated, the control-and-management module 100 will notify the control-and-management module about the newest signal and execute a command corresponding to the newest signal. So that abilities to dispatch commands are enhanced.

It should be noted that this embodiment does not limit the model of the control-and-management chip U1, and it will suffice as long as the existing control-and-management chip U1 is with the above-mentioned functional pins.

To illustrate further, the control circuit board 10 further includes a power input module 101 and a DC-DC module 102.

The power input module 101 includes power input port CN1, capacitor C3, capacitor C4, capacitor C19, resistor R5, resistor R6, voltage regulator diode DZ1 and voltage regulator diode DZ7.

Pin 2 of the power input port CN1, one end of capacitor C19, one end of capacitor C3, the negative pole of voltage regulator diode DZ7, and one end of resistor R5 are all electrically connected to the input of the DC-DC module 102 and to the motor drive module 106, respectively.

Pin 1 of the power input port CN1, the other end of capacitor C19, the other end of capacitor C3, a positive pole of voltage regulator diode DZ7, one end of resistor R6, a positive pole of voltage regulator diode DZ1 and one end of capacitor C4 are all grounded.

The other end of resistor R5, the other end of resistor R6, a negative pole of voltage regulator diode DZ1 and the other end of capacitor C4 all are electrically connected to the control-and-management module 100.

Specifically, the power input module 101 provides power respectively to the control management module 100, the DC-DC module 102, and solder wires; through the soldered wires, power is further provided to the ceiling fan motor 2 and the lamp 3, and through the DC-DC module 102, DC power is provided to the action control module 103 and the communication module.

Specifically, voltage regulator diode DZ1 and voltage regulator diode DZ7 are added to the power input module 101, so that if the power supply voltage fluctuates, or if the voltage changes at various points in the circuit due to other reasons, it can be ensured that the input voltage will basically remain unchanged, thus ensuring a smooth operation of the ceiling fan and the lamp 3.

It is further illustrated that the DC-DC module 102 includes DC-DC chip U3, capacitor C1, inductor L1 and capacitor C25.

Pin 4 of the DC-DC chip U3 is a power input terminal, and pin 4 of the DC-DC chip U3 is electrically connected to both pin 2 of the power input port CN1 and one end of capacitor C1.

Pin 3 of the DC-DC chip U3 is an output port, pin 5 of the DC-DC chip U3 is an output voltage feedback port, and pin 3 of the DC-DC chip U3 is electrically connected to one end of inductor L1, and the other end of inductor L1 and pin 5 of the DC-DC chip U3 are electrically connected to the one end of capacitor C25, and the one end of capacitor C25 serves as a 5V voltage output terminal, and pin 1 of the write port J3 is electrically connected to the 5V voltage output terminal.

Pin 2 of the DC-DC chip U3 is the power supply ground, and pin 2 of the DC-DC chip U3, the other end of capacitor C1 and the other end of capacitor C25 all are grounded.

In this embodiment, the DC-DC module 102 is configured to convert a fixed input DC voltage to a variable DC voltage 5V and utilize an inductor as an energy storage element. Specifically, when the DC input voltage is applied to output filter inductor L1, the current flows through the inductor into the DC-DC chip U3 for step-down and then flows to the load; when the DC voltage input is abnormal, the energy stored in inductor L1 maintains a current through the load.

It should be noted that the DC-DC chip U3 is a step-down type chip. This embodiment does not limit the model number of the DC-DC chip U3, and it will suffice as long as the existing DC-DC chip U3 is with the above-mentioned functional pins.

It is further illustrated that the action control module 103 includes wire-pulling control port J2, diode D1, diode D7, diode D13 and resistor R14.

The wire-pulling control port J2 is externally connected to the pull wire 5.

Pin 4 of the wire-pulling control port J2 is electrically connected to a negative terminal of diode D7 and the control-and-management module 100, respectively.

Pin 3 of the wire-pulling control port J2 is electrically connected to a negative terminal of diode D1 and the control-and-management module 100, respectively.

Pin 2 of the wire-pulling control port J2 is electrically connected to a negative terminal of diode D13 and the control-and-management module 100, respectively.

Pin 1 of the wire-pulling control port J2 is electrically connected to one end of resistor R14.

A positive lead of diode D7, a positive lead of diode D7, a positive lead of diode D7 and the other end of resistor R14 are all grounded.

In this embodiment, the action control module 103 provides different control signals to the control-and-management module 100 via the pull wire 5, including three kinds of signals, namely light control, option control, and forward/reverse rotation control, so as to be able to realize corresponding functions of the ceiling fan and the lamp 3.

To illustrate further, the RF module 104 includes RF port CN3, capacitor C12, capacitor C13, capacitor C30 and resistor R36.

Pin 4 of the RF port CN3, one end of capacitor C12 and one end of capacitor C13 all are electrically connected to the 5V voltage output terminal, and the other end of capacitor C12 and the other end of capacitor C13 are both grounded.

Both pin 3 and pin 2 of the RF port CN3 are electrically connected to one end of resistor R36, and the other end of resistor R36 is electrically connected to one end of the control-and-management module 100 and capacitor C30, respectively, and the other end of capacitor C30 and pin 1 of the RF port CN3 are both grounded.

In this embodiment, a user is able to simultaneously control the ceiling fan through the cell phone APP and the cell phone voice as well as the smart speaker voice control (i.e., Wi-Fi signals or Bluetooth signals) and the remote control (i.e., remote control signals), which can be in parallel, and the user is able to realize long-distance interactions with the ceiling fan and the lamp 3 without being subject to the limitations and constraints of various distances. Even if the user loses the remote control, the lamp 3 with the pull wire switch can still be controlled by the cell phone and smart speaker, and thereby superb user experiences are provided.

To further illustrate, the Wi-Fi module 105 includes a Wi-Fi chip U2, capacitor C8, capacitor C14, resistor R37 and resistor R42.

The VBAT terminal of the Wi-Fi chip U2 is a power input terminal, and all of the VBAT terminal of the Wi-Fi chip U2, one end of capacitor C8 and one end of capacitor C14 are electrically connected to the 5V voltage output terminal; the other end of capacitor C8, the other end of capacitor C14 and the GND terminal of the Wi-Fi chip U2 are all grounded.

RXD2 pin of the Wi-Fi chip U2 is a serial port communication terminal, RXD2 pin of the Wi-Fi chip U2 is electrically connected to one end of resistor R42, and the other end of resistor R42 is electrically connected to the control-and-management module 100.

TXD pin of the Wi-Fi chip U2 is a serial port communication terminal, TXD pin of the Wi-Fi chip U2 is electrically connected to one end of resistor R37, and the other end of resistor R37 is electrically connected to one end of resistor R15, and the other end of resistor R15 is an optocoupler-detection reserved hole.

In this embodiment, in order to be able to extend the life cycle of the product, the product is provided with an optocoupler-detection reserved hole, so that when there is an abnormality in the Wi-Fi module 105, the Wi-Fi module 105 can be detected whether it is normal by means of the optocoupler-detection reserved hole, which facilitates the maintenance afterwards.

It should be noted that this embodiment does not limit the model of the Wi-Fi chip U2, and it will suffice as long as the existing Wi-Fi chip U2 is with the above-mentioned functional pins.

To illustrate further, the motor drive module 106 includes a first switching transistor chip V1, a second switching transistor chip V2, a third switching transistor chip V3 and socket J1.

Pin 2 of the first switching transistor chip V1 is electrically connected to one end of resistor R21 and one end of resistor R27, respectively, and the other end of resistor R21 is electrically connected to the control-and-management module 100, and the other end of resistor R27 and pin 1 of the first switching transistor chip V1 are electrically connected to one end of resistor R29, one end of resistor R11, one end of resistor R31 and one end of resistor R35, respectively. The other end of resistor R27 and pin 1 of the first switching transistor chip V1 are electrically connected to one end of resistor R29, one end of resistor R11, one end of resistor R31, and one end of resistor R35, respectively, and the other end of resistor R29 is grounded, and the other end of resistor R11 is electrically connected to one end of capacitor C11 and to one end of the control- and management module 100, the other end of capacitor C11 is electrically connected to one end of resistor R28 and the control-and-management module 100, respectively, and the other end of resistor R28 is electrically connected to the third switching transistor chip V3. The other end of resistor R31 is electrically connected to one end of capacitor C10 and the control-and-management module 100, respectively, and the other end of capacitor C10 is electrically connected to one end of resistor R32 and the control-and-management module 100, respectively, and the other end of resistor R32 is electrically connected to one end of resistor R32 and the control-and-management module 100, respectively. the other end of capacitor C10 is electrically connected to one end of resistor R32 and the control-and-management module 100 respectively, the other end of resistor R32 is electrically connected to the second switching transistor chip V2, the other end of resistor R35 is electrically connected to one end of capacitor C16 and the control-and-management module 100 respectively, and the other end of capacitor C16 is grounded; pin 3 of the first switching transistor chip V1 is electrically connected to one end of resistor R26, the control-and-management module 100, the motor drive module 106, the power input module 101, the DC-DC module 102 and the soldering wires, respectively. The other end of resistor R26 and pin 4 of the first switching transistor chip V1 are electrically connected to one end of resistor R20, and the other end of resistor R20 is electrically connected to the control-and-management module 100; pin 5, pin 6, pin 7 and pin 8 of the first switching transistor chip V1 are electrically connected to pin 3 of the socket J1.

Pin 2 of the second switching transistor chip V2 is electrically connected to one end of resistor R19 and one end of resistor R25 respectively, the other end of resistor R19 is electrically connected to the control-and-management module 100, and the other end of resistor R25 and pin 1 of the second switching transistor chip V2 are electrically connected to both one end of resistor R30 and the other end of resistor R32. The other end of resistor R30 is grounded.

Pin 3 of the second switching transistor chip V2 is electrically connected to one end of resistor R24, the control-and-management module 100, the motor drive module 106, the power input module 101, the DC-DC module 102 and the soldering wires. The other end of resistor R24, pin 4 of the second switching transistor chip V2 and one end of resistor R18 are electrically connected. The other end of resistor R18 is electrically connected to the control-and-management module 100; and pin 5, pin 6, pin 7 and pin 8 of the second switching transistor chip V2 are electrically connected to pin 2 of the socket J1.

Pin 2 of the third switching transistor chip V3 is electrically connected to one end of resistor R17 and one end of resistor R23, respectively, and the other end of the resistor R17 is electrically connected to the control-and-management module 100, and the other end of the resistor R23 and pin 1 of the third switching transistor chip V3 are both electrically connected to one end of resistor R33 and the other end of resistor R28. The other end of the resistor R33 is grounded. Pin 3 of the third switching transistor chip V3 is electrically connected to one end of resistor R22, the control-and-management module 100, the motor drive module 106, the power input module 101, the DC-DC module 102 and the soldering wires. The other end of resistor R22, pin 4 of the third switching transistor chip V3 and one end of resistor R16 are electrically connected together. The other end of resistor R16 is electrically connected to the control-and-management module 100; and pin 5, pin 6, pin 7 and pin 8 of the third switching transistor chip V3 are electrically connected to pin 1 of the socket J1.

In this embodiment, the motor drive module 106 reads the 5V or less digital signals on the pins of the MCU of the control-and-management module 100 on the control circuit board 10 to determine whether it is a protocol based on voltages or on high-and-low level changes, and thereby correspondingly decodes according to the voltages or the high-and-low level changes, and issues a corresponding control instruction to realize a corresponding function.

It is to be noted that the switching transistors in the first switching transistor chip V1, the second switching transistor chip V2, and the third switching transistor chip V3 may be switching transistors such as a triode, a field effect transistor, and a thyristor, etc., and a field effect transistor chip is used in this example.

To further illustrate, the lamp driver module 107 includes a socket J7.

Both pin 1 and pin 2 of the socket J7 are electrically connected to the control-and-management module 100, the motor drive module 106, the power input module 101 and the DC-DC module 102 via the soldering wires.

Pin 3 of the socket J7 is grounded.

Pin 4 of the socket J7 is connected to 5V.

Pin 5 and pin 6 of the socket J7 are electrically connected to the control-and-management module 100.

In this embodiment, the lamp driver module 107 is electrically connected to the control-and-management module 100, the motor drive module 106, the power input module 101, and the DC-DC module 102 via respective soldering wires, which realize on/off control and dimming control of the lamp 3; and as a result, multiple control modes can be used for such products.

The technical principles of the present invention are described above in connection with specific embodiments. These descriptions are only intended to explain the principles of the present invention, and are not to be construed in any way as a limitation on the scope of protection of the present invention. Based on the explanations herein, other specific embodiments of the present invention can be associated by those skilled in the art without creative labor, and these equivalent variations or substitutions are included in the scope limited by the claims of this application.

Although the present invention has been disclosed as above by way of a preferred embodiment, it is not intended to limit the present invention, and any one skilled in the art may make certain changes and modifications without departing from the spirit and scope of the present invention, and therefore the scope of protection of the present invention shall be subject to the scope of the appended patent claims as defined herein.

What is claimed is:

1. A ceiling-fan lamp with multiple control modes, comprising: a housing, a ceiling-fan motor, a lamp, ceiling-fan blades, a pull wire and a control circuit board;

the ceiling-fan motor, the lamp and the control circuit board all installed in an accommodating cavity of the housing, and the ceiling-fan blades and the pull wire each extending to an exterior of the housing;

the control circuit board being electrically connected to a DC power supply with voltage less than or equal to 48V, and the control circuit board including a control-and-management module, an action control module, a communication module, a motor drive module and a lamp driver module;

the action control module and the communication module being electrically connected to the control-and-management module respectively, the action control module configured to receive action signals generated by the pull wire, the action signals being digital signals, and the communication module configured to receive communication signals;

the motor drive module being electrically connected to the ceiling-fan motor;

the lamp driver module being electrically connected to the lamp;

the control-and-management module configured to receive and process the action signals or the communication signals, and then providing first control signals and second control signals respectively to the motor drive module and the lamp driver module, and the motor drive module configured to drive the ceiling-fan motor to work or stop working according to the first control signals, so as to control the rotation or stopping of the ceiling-fan blades; the lamp driver module configured to control the lamp to glow or go out according to the second control signals;

wherein the control-and-management module is to process a latest received signal out of the two of the action signals and the communication signals, and after processing the latest received signal, the control-and-management module issues corresponding control commands to the motor drive module and the lamp drive module;

the control-and-management module including a control-and-management chip;

the communication module being a Wi-Fi module which includes a Wi-Fi chip, resistors and capacitors;

the Wi-Fi module including an optocoupler-detection reserved hole for detecting abnormality in the Wi-Fi module;

a transmission data (TXD2) terminal of the Wi-Fi chip being a serial port communication terminal, and the TXD2 terminal electrically connected to a SPEED_TXD terminal of the control-and-management chip;

a second receiving data (RXD2) terminal of the Wi-Fi chip being a serial port communication terminal, and the RXD2 terminal electrically connected to a receiving data (RXD) signal terminal of the control-and-management chip;

wherein the Wi-Fi module receives the communication signals, and provides the communication signals via the RXD2 terminal and the TXD2 terminal of the Wi-Fi chip each to the RXD signal terminal and the SPEED_TXD terminal of the control-and-management chip.

2. The ceiling-fan lamp with multiple control modes as claimed in claim 1, the control-and-management chip including:

a low-voltage power supply terminal to receive a 5V voltage;

a pair of pulse-width modulation (PWM) channel terminals, the pair of PWM channel terminals electrically connected to the lamp driver module, and providing the second control signals to the lamp driver module;

a radio frequency access (RFA) terminal, the RFA terminal being electrically connected to a radio frequency (RF) module;

a plurality of PWM drive output terminals, the plurality of PWM drive output terminals electrically connected to the motor drive module, and providing the first control signals to the motor drive module;

a VBUS terminal, the VBUS terminal electrically connected to a power input module and receiving a VBUS voltage therefrom;

a 5V low-dropout regulator (LDO5V) terminal;

a medium-voltage power supply terminal, the medium-voltage power supply terminal electrically connected with the power input module and receiving a medium voltage therefrom;

a system ground terminal, the system ground terminal being grounded;

a speed signal terminal, the speed signal terminal electrically connected to the action control module, and receiving a speed option signal therefrom;

a lamp control signal terminal, the lamp control signal terminal electrically connected to the action control module, and receiving a lamp control signal therefrom;

a forward-reverse control signal terminal, the forward-reverse control signal terminal electrically connected to the action control module, and receiving a forward-reverse control signal therefrom.

3. The ceiling-fan lamp with multiple control modes as claimed in claim 2, the control circuit board further including the power input module and a DC-DC module;

the power input module including a power input port, capacitors, resistors and voltage regulator diodes;

the power input module providing the medium-voltage to the control-and-management chip, the DC-DC module, the motor drive module and the lamp driver module;

the power input module providing the VBUS voltage to the control-and-management chip.

4. The ceiling-fan lamp with multiple control modes as claimed in claim 3, the DC-DC module including a DC-DC chip, an inductor and capacitors;

the DC-DC chip receiving the medium voltage from the power input module and converting the medium voltage to the 5V voltage which is provided to the communication module, the lamp driver module and the low-voltage power supply terminal of the control-and-management chip.

5. The ceiling-fan lamp with multiple control modes as claimed in claim 4, the action control module including a control port, a resistor and diodes;

the action control module being able to adopt a pull wire control, a toggle control or a pushbutton control or combinations of the above through mounting a pull wire switch, a toggle switch or a pushbutton switch or combinations of the above on the housing to generate various control signals including the lamp control signal, the speed option signal, and the forward-reverse control signal which are sent to the control-and-management chip.

6. The ceiling-fan lamp with multiple control modes as claimed in claim 1, the communication module being an RF module which includes an RF port, a resistor and capacitors;

the RF port electrically connected to an RFA terminal of the control-and-management chip through the resistor; the RF port receiving the communication signals and providing the communication signals to the RFA terminal of the control-and-management chip.

7. The ceiling-fan lamp with multiple control modes as claimed in claim 1, the motor drive module including a first switching transistor chip, a second switching transistor chip, a third switching transistor chip and a socket;

the first switching transistor chip, the second switching transistor chip, and the third switching transistor chip all receiving a medium voltage;

a plurality of PWM drive output terminals of the control-and-management chip including a first pair of PWM drive output terminals, a second pair of PWM drive output terminals, and a third pair of PWM drive output terminals which are respectively electrically connected to the first switching transistor chip, the second switching transistor chip, and the third switching transistor chip; wherein the first control signals are configured to drive the first switching transistor chip, the second switching transistor chip, and the third switching transistor chip respectively through the first pair of PWM drive output terminals, the second pair of PWM drive output terminals, and the third pair of PWM drive output terminals.

8. The ceiling-fan lamp with multiple control modes as claimed in claim 7, the lamp driver module including a socket;

through the socket, the lamp driver module receiving the medium voltage from a power input module, receiving a 5V voltage from a DC-DC module, and receiving the second control signals from the control-and-management chip, so as to provide the medium voltage, the 5V voltage and the second control signals to the lamp.

9. The ceiling-fan lamp with multiple control modes as claimed in claim 1, the control-and-management chip including:

a low-voltage power supply terminal to receive a 5V voltage;

a pair of PWM channel terminals, the pair of PWM channel terminals electrically connected to the lamp driver module, and providing the second control signals to the lamp driver module;

an RFA terminal, the RFA terminal being electrically connected to an RF module;

a plurality of PWM drive output terminals, the plurality of PWM drive output terminals electrically connected to the motor drive module, and providing the first control signals to the motor drive module;

a VBUS terminal, the VBUS terminal electrically connected to a power input module and receiving a VBUS voltage therefrom;

a LDO5V terminal;

a medium-voltage power supply terminal, the medium-voltage power supply terminal electrically connected with the power input module and receiving a medium voltage therefrom;

a system ground terminal, the system ground terminal being grounded;

the RXD signal terminal electrically connected to a Wi-Fi module, and receiving an RXD signal therefrom;

an SW clock terminal;

the SPEED_TXD terminal electrically connected to the Wi-Fi module, and receiving a TXD signal therefrom.

10. The ceiling-fan lamp with multiple control modes as claimed in claim 9, the control circuit board further including the power input module and a DC-DC module;

the power input module including a power input port, capacitors, resistors and voltage regulator diodes;

the power input module providing the medium-voltage to the control-and-management chip, the DC-DC module, the motor drive module and the lamp driver module;

the power input module providing the VBUS voltage to the control-and-management chip.

11. The ceiling-fan lamp with multiple control modes as claimed in claim 10, the DC-DC module including a DC-DC chip, an inductor and capacitors;

the DC-DC chip receiving the medium voltage from the power input module and converting the medium voltage to the 5V voltage which is provided to the communication module, the lamp driver module and the low-voltage power supply terminal of the control-and-management chip.

* * * * *